United States Patent [19]
Delaney et al.

[11] Patent Number: 4,936,628
[45] Date of Patent: Jun. 26, 1990

[54] CHILD CAR SEAT

[76] Inventors: Marjorie D. Delaney, 11 Lanneau Dr., Greenville, S.C. 29605; Rita Ramage, 109 Butler Ave., Greenville, S.C. 29601

[21] Appl. No.: 426,664
[22] Filed: Oct. 26, 1989
[51] Int. Cl.⁵ .............................................. A47B 83/02
[52] U.S. Cl. ................................... 297/250; 297/153; 297/487
[58] Field of Search ............... 297/250, 153, 154, 155, 297/487, 488

[56] References Cited
U.S. PATENT DOCUMENTS

| | | |
|---|---|---|
| 3,512,829 | 5/1970 | Paris . |
| 4,288,123 | 9/1981 | Cone ..................................... 297/154 |
| 4,413,838 | 11/1983 | Varterasian et al. . |
| 4,456,302 | 6/1984 | Knoedler et al. . |
| 4,568,122 | 2/1986 | Kain ..................................... 297/488 |
| 4,580,842 | 4/1986 | Segal ............... 297/250 X |
| 4,582,359 | 4/1986 | Wise et al. ....................... 297/153 X |
| 4,671,574 | 6/1987 | Kassai ............... 297/488 X |
| 4,729,600 | 3/1988 | Single et al. . |
| 4,765,685 | 8/1988 | Sudoh et al. . |
| 4,795,209 | 1/1989 | Quinlan, Jr. et al. ............... 297/153 |

Primary Examiner—Peter A. Aschenbrenner
Attorney, Agent, or Firm—Jerry T. Kearns

[57] ABSTRACT

A child car seat includes a seat frame having a vertical seat back portion and a horizontal seat bottom portion, both covered with a resilient padding material. Lateral supports on the seat back and seat bottom portions restrain a child from lateral movement, and a padded vertical leg divider extends upwardly on the seat bottom portion. A pair of mounting posts extend upwardly from opposite sides of the seat bottom portion, adjacent a forward edge and a tray is detachably mounted by a releasable hinge on each of the mounting posts. The tray may be selectively pivotally raised from either a left or right side of the seat bottom portion, or may be entirely detached and removed from the seat. A pair of fasteners are provided on opposite sides of the seat frame for engagement with opposite buckle ends of a conventional vehicle seat belt.

6 Claims, 3 Drawing Sheets

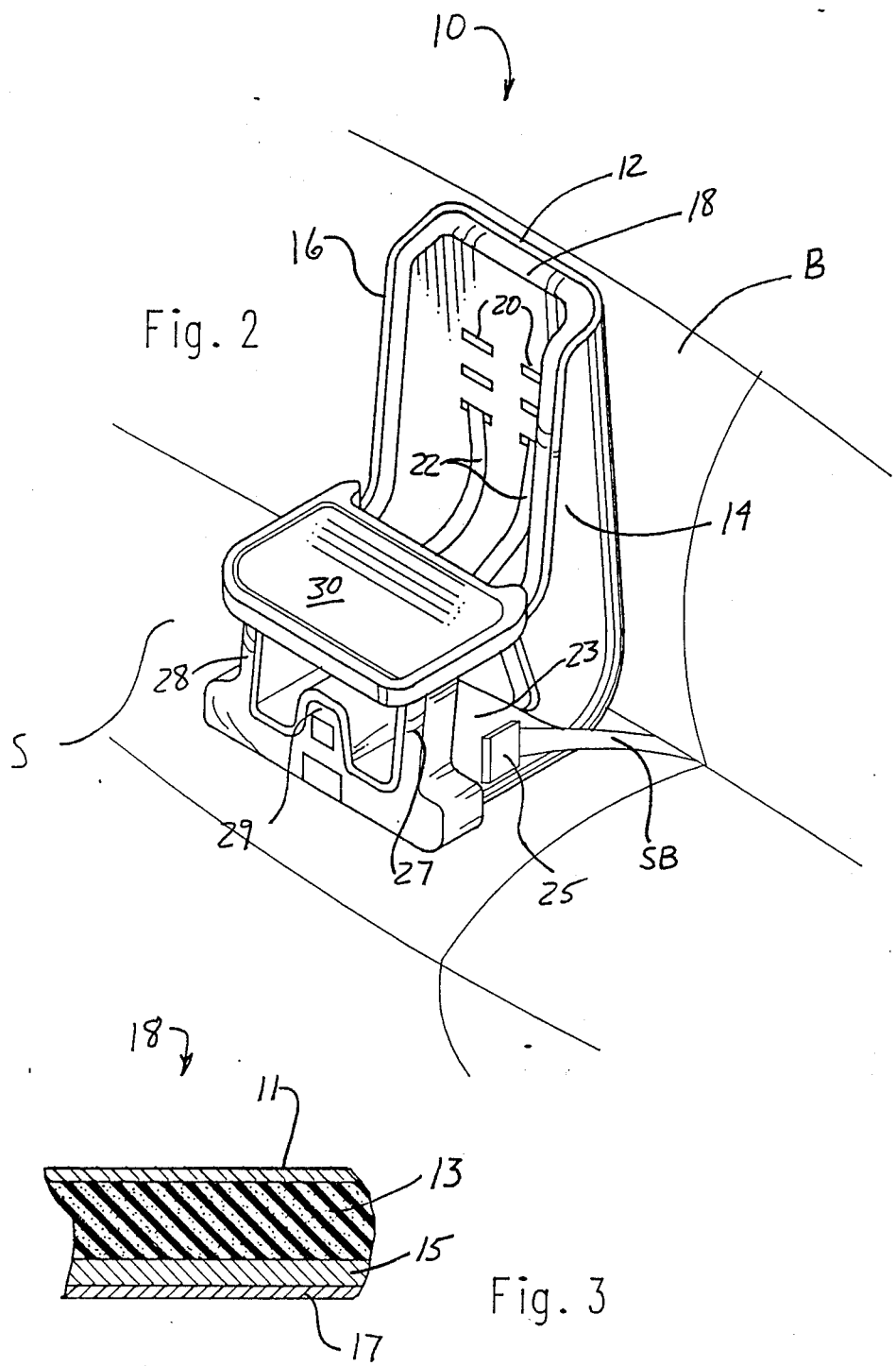

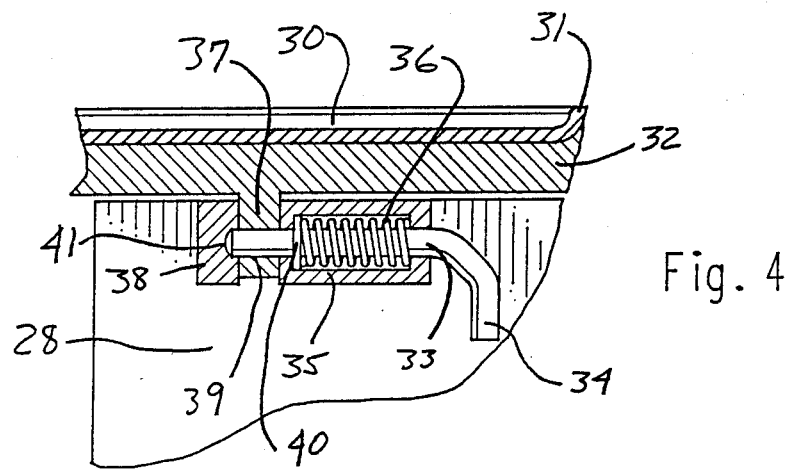
Fig. 4
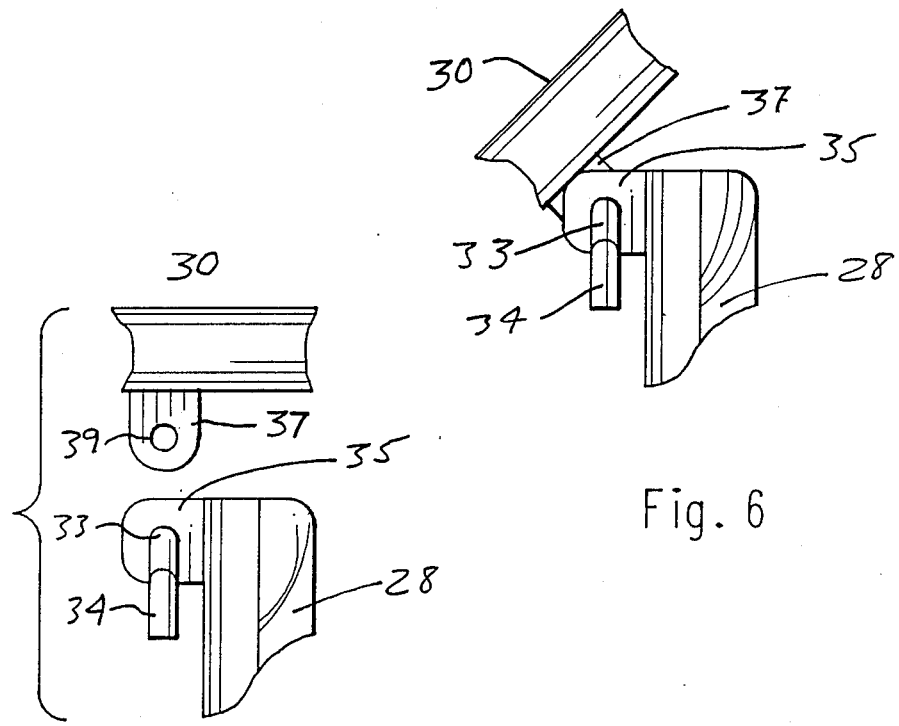
Fig. 6
Fig. 5

CHILD CAR SEAT

BACKGROUND OF THE INVENTION

1. Field of the Invention

The present invention relates to child car seats, and more particularly pertains to a child car seat having a removable tray. Various forms of car seats having fixed or detachable trays are known in the prior art. However, it is frequently desired to pivot the tray to an open position from side to side to allow a child to be placed into or removed from the car seat. If the car seat is mounted on the left hand side of a vehicle rear seat, it is desirable to pivot the tray toward the right hand side of the car seat. Alternatively, if the car seat is secured on the right hand side in the rear seat of a vehicle, it is more convenient if the tray pivots open toward the left hand side of the vehicle. In order to provide this advantageous feature, the present invention provides a car seat having a tray which may be selectively pivoted open from either side of the seat, or may be entirely detached and removed.

2. Description of the Prior Art

Various types of child car seats are known in the prior art. A typical example of such a child car seat is to be found in U.S. Pat. No. 3,512,829, which issued to R. Paris on May 19, 1970. This patent discloses an infant seat having a reinforced padded removable tray. U.S. Pat. No. 4,413,838, which issued to J. Varterasian et al on Nov. 8, 1983, discloses a restraint table for a vehicle that is normally stored within a console located along one side of a passenger seat and is connected to the console by a hinged member which allows sequential movement of the restraint table about a pair of substantially perpendicular axes so that the restraint table assumes a position in front of an occupant seated in the passenger seat. U.S. Pat. No. 4,456,302, which issued to R. Knoedler et al on June 26, 1984, discloses a seat for a child including a hinged front padded restraining barrier. U.S. Pat. No. 4,729,600, which issued to A. Single II et al on Mar. 8, 1988, discloses a multi-mode child restraint system including a seat and a bolster adapted to releasably engage the seat. The seat includes a pivotal impact shield and is adapted for securement to a motor vehicle seat by a conventional seat belt. U.S. Pat. No. 4,765,685, which issued to K. Sudoh et al on Aug. 23, 1988, discloses a child car seat including a protective support disposed in front of a child sitting on a seat section. The protective support is releasably secured to the seat section by a belt assembly.

While the above mentioned devices are directed to child car seats, none of these devices disclose a child car seat having a tray which is mounted by releasable hinge mechanisms for selective pivotal movement from either a left or right side of the seat and which may be completely detached and removed from the seat. Inasmuch as the art is relatively crowded with respect to these various types of child car seats, it can be appreciated that there is a continuing need for and interest in improvements to such child car seats, and in this respect, the present invention addresses this need and interest.

SUMMARY OF THE INVENTION

In view of the foregoing disadvantages inherent in the known types of child car seats now present in the prior art, the present invention provides an improved child car seat. As such, the general purpose of the present invention, which will be described subsequently in greater detail, is to provide a new and improved child car seat which has all the advantages of the prior art child car seats and none of the disadvantages.

To attain this, a representative embodiment of the concepts of the present invention is illustrated in the drawings and makes use of a child car seat which includes a seat frame having a vertical seat back portion and a horizontal seat bottom portion, both covered with a resilient padding material. Lateral supports on the seat back and seat bottom portions restrain a child from lateral movement, and a padded vertical leg divider extends upwardly on the seat bottom portion. A pair of mounting posts extend upwardly from opposite sides of the seat bottom portion, adjacent a forward edge and a tray is detachably mounted by a releasable hinge on each of the mounting posts. The tray may be selectively pivotally raised from either a left or right side of the seat bottom portion, or may be entirely detached and removed from the seat. A pair of fasteners are provided on opposite sides of the seat frame for engagement with opposite buckle ends of a conventional vehicle seat belt.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child car seat which has all the advantages of the prior art child car seats and none of the disadvantages.

It is another object of the present invention to provide a new and improved child car seat which may be easily and efficiently manufactured and marketed.

It is a further object of the present invention to provide a new and improved child car seat which is of a durable and reliable construction.

An even further object of the present invention is to provide a new and improved child car seat which is susceptible of a low cost of manufacture with regard to both materials and labor, and which accordingly is then susceptible of low prices of sale to the consuming public, thereby making such child car seats economically available to the buying public.

Still yet another object of the present invention is to provide a new and improved child car seat which provides in the apparatuses and methods of the prior art some of the advantages thereof, while simultaneously overcoming some of the disadvantages normally associated therewith.

Still another object of the present invention is to provide a new and improved child car seat including cooperating fasteners configured for engagement with opposite buckle ends of a conventional vehicle seat belt.

Yet another object of the present invention is to provide a new and improved child car seat having an easily openable tray to allow a child to be placed into or removed from the seat.

Even still another object of the present invention is to provide a new and improved child car seat having a tray mounted by releasable hinge mechanisms for selective opening from a left or right side of the seat, and which may be completely detached and removed from the seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the child car seat installed on a conventional vehicle seat.

FIG. 3 is a cross sectional detail view illustrating the padded construction of the child car seat.

FIG. 4 is a detail view, partially in cross section, illustrating a releasable hinge mechanism for securing the tray on the car seat.

FIG. 5 is an exploded partial detail view further illustrating the construction of the releasable hinge mechanism of FIG. 4.

FIG. 6 is an assembled detail view illustrating the tray secured in an open position by a releasable hinge mechanism.

DESCRIPTION OF THE PREFERRED EMBODIMENT

Figure 1:
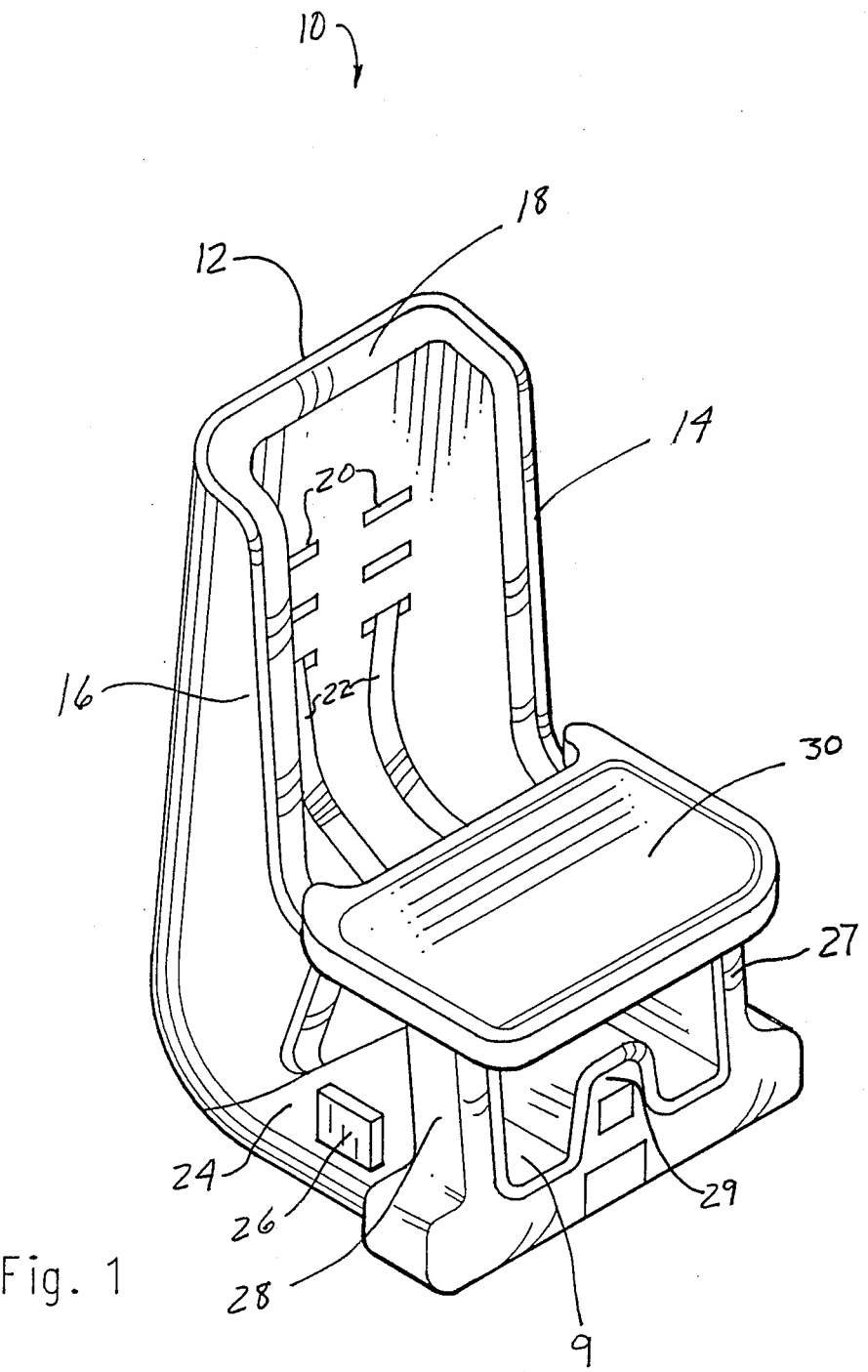
FIG. 1 is a perspective view of the child car seat according to the present invention.

With reference now to the drawings, and in particular to FIG. 1 thereof, a new and improved child car seat embodying the principles and concepts of the present invention and generally designated by the reference numeral 10 will be described.

More specifically, it will be noted that the first embodiment 10 of the invention includes a seat frame having a vertical seat back portion 12 and a horizontal seat bottom portion 9. A pair of lateral supports 14 and 16 are provided on opposite sides of the seat back portion 12 and serve to restrain a child from lateral movement when seated within the car seat 10. A similar lateral support 24 is provided at each side of the seat bottom portion 9. The entire seat frame is covered by a resilient padding 18, to protect a child seated therein. Cooperating fasteners 26 are provided on opposite sides of the seat frame for engagement with opposite ends of a conventional vehicle seat belt. A pair of mounting posts 27 and 28 extend upwardly from opposite side edges of the seat bottom portion 9, adjacent a forward edge of the seat bottom portion 9. A tray 30 is detachably mounted by a releasable hinge mechanism on each of the mounting posts 27 and 28. The releasable hinge mechanisms, to be subsequently described and illustrated, allow the tray 30 to be pivoted about a horizontal axis and selectively open from either the left or right side of the seat 10. A padded leg support 29 extends upwardly from a central portion of the seat bottom 9 and divides a child's legs, locating them in a protected position. A pair of straps 22 are received in adjustable fashion through aligned pairs of slots 20, to allow adaptation to various different sized children. The straps 22 restrain the child within the seat 10, and may be secured by conventional buckle fasteners or by hook and loop type fasteners of the type sold under the trademark VELCRO.

FIG. 2 is a perspective view which illustrates the seat 10 installed on a conventional vehicle seat including a seat bottom portion S and a seat back portion B. The conventional buckle ends of a vehicle seat belt SB are engaged in cooperating fasteners 25 and 26 (FIG. 1), disposed on opposite side portions of the seat 10. The fastener 25 is located on the seat bottom portion lateral support 23, and the fastener 26 is disposed in a symmetric fashion on the seat bottom lateral support member 24, as illustrated in FIG. 1. The entire seat 10 is lined with a resilient pad 18 to protect a child from injury in the event of a vehicle accident.

FIG. 3 is a cross sectional view which illustrates the construction of the seat padding 18. An upper water proof plastic or vinyl outer covering 11 is formed over a sponge rubber resilient padding layer 13 which is adhesively secured a semiresilient backing member 15, which may be formed from a synthetic plastic material. The backing member 15 is secured to a rigid molded plastic material 17, utilized to form the seat frame portion. The backing member 15 may be secured through the use of adhesives, or by cooperating fasteners such as snaps, or hook and loop type fasteners.

FIG. 4 is a detail view which illustrates the construction of a releasable hinge mechanism utilized to secure the tray 30 on a top portion of the mounting post 28. It should be noted that an identical mechanism is utilized to mount the opposite side of the tray 30 on the opposite side mounting post 27, illustrated in FIG. 1. The releasable hinge mechanism includes a well 35 having coaxial apertures which receive a hinge pin 33. The hinge pin 33 includes a radiused bent handle portion 34 for manually axially reciprocating the pin 33. A radial flange 40 is secured to the pin 33, within the interior of the well 35 and is in abutment with one end of a coil spring 36 which surrounds the pin 33. As may now be understood, the spring 36 biases the pin 33 to the left, as shown in FIG. 4. A downwardly extending mounting tab 37 is formed on a bottom surface of the tray 30. The tray 30 includes a rigid frame portion 32, preferably formed from a molded plastic material, and a protective resilient padding 31, to protect a child from injury. An aperture 39 is formed through the tab 37, in alignment with the pin 33. A stationary locking lug 38 is secured to the mounting post 28 and includes a recess 41 in alignment with, and dimensioned to receive an end portion of the pin 33. In the illustrated latched position, the tab 37 is captured between the well 35 and the locking lug 38. If the opposite side of the tray 30 is released from engagement with the mounting post 27, the tray 30 may be pivoted to an open position, by virtue of relative movement between the tab 37 and the stationary pin 33. Similarly, by retracting the pin 39 from engagement with the tab 37, the tray may be released from engagement with the mounting post 28 and pivoted to an open position, with the opposite side of the tray 30 remaining pivotally secured to the mounting post 27. If it is desired to completely remove the tray 30, both of the pins 33 on each of the mounting posts 27 and 28 may be released from the cooperating tab portions 37 at opposite sides of the tray 30 to completely detach the tray 30 from the child car seat.

FIG. 5 is a partial exploded detail view illustrating the tab 37 at one side of the tray 30 detached from the pin 33.

FIG. 6 illustrates the tray 30 pivoted to an open position by virtue of relative rotation between the tab 37 and the pin 33.

As may now be understood, the present invention provides a child car seat with a selectively openable or detachable car seat which facilitates convenient placement and removal of a child within the seat.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A child car seat, comprising:
   a seat frame having a vertical seat back portion and a horizontal seat bottom portion;
   lateral supports on said seat back and seat bottom portions to restrain a child from lateral movement;
   a pair of mounting posts extending upwardly from opposite sides of said seat bottom portion, adjacent a forward edge of said seat bottom portion; and
   a tray detachably mounted by a releasable hinge on each of said mounting posts, whereby said tray may be pivotally raised from either a left or right side of said seat bottom portion, or may be entirely removed from said seat.

2. The child car seat of claim 1, wherein said seat frame is covered by a resilient padding material.

3. The child car seat of claim 1, further comprising a pair of fasteners on opposite sides of said seat frame configured for engagement with opposite buckle ends of a conventional vehicle seat belt.

4. The child car seat of claim 1, wherein each of said releasable hinges comprise:
   a hollow well on said mounting posts having aligned apertures receiving a reciprocal hinge pin;
   a radial flange on said pin within said well;
   a coil spring surrounding said pin within said well and biasing said pin to a latched position;
   a handle portion on an end of said pin for manually moving said pin to an unlatched position;
   a stationary locking lug on said mounting posts, said lug having a recess in alignment with and dimensioned to receive said pin;
   a downwardly extending tab on said tray, said tab having an aperture receiving said pin; and
   said tab received in a latched position between said well and said lug.

5. The child car seat of claim 1, further comprising a padded vertical leg divider on said seat bottom portion.

6. The child car seat of claim 1, further comprising strap means on said seat for restraining a child.

* * * * *